(12) United States Patent
Anderson et al.

(10) Patent No.: US 10,281,302 B2
(45) Date of Patent: May 7, 2019

(54) ARRANGEMENT AND METHOD TO SENSE FLOW USING MECHANICAL STRESS MICROSENSORS

(71) Applicant: Siemens Industry, Inc., Alpharetta, GA (US)

(72) Inventors: Dean B. Anderson, Wonder Lake, IL (US); Matthew D. Cook, Antioch, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 111 days.

(21) Appl. No.: 14/299,098

(22) Filed: Jun. 9, 2014

(65) Prior Publication Data

US 2014/0295750 A1    Oct. 2, 2014

Related U.S. Application Data

(60) Continuation of application No. 12/220,848, filed on Jul. 29, 2008, now Pat. No. 8,764,529, which is a division of application No. 11/528,710, filed on Sep. 27, 2006, now abandoned, which is a (Continued)

(51) Int. Cl.
| | |
|---|---|
| *F24F 11/00* | (2018.01) |
| *G01F 1/28* | (2006.01) |
| *F16K 1/16* | (2006.01) |
| *F24F 11/30* | (2018.01) |
| *F24F 11/70* | (2018.01) |
| *F24F 11/74* | (2018.01) |

(Continued)

(52) U.S. Cl.
CPC ............... *G01F 1/28* (2013.01); *F16K 1/165* (2013.01); *F24F 11/30* (2018.01); *F24F 11/70* (2018.01); *F24F 11/74* (2018.01); *F24F 2110/00* (2018.01); *F24F 2110/30* (2018.01); *Y10T 137/7722* (2015.04)

(58) Field of Classification Search
CPC .................................. F24F 11/04; F24F 11/03
USPC ......................................................... 454/256
See application file for complete search history.

(56) References Cited

U.S. PATENT DOCUMENTS

| | | | | |
|---|---|---|---|---|
| 4,873,873 A | * | 10/1989 | Day .......................... | 73/861.63 |
| 4,926,903 A | * | 5/1990 | Kawai ........................ | 137/554 |
| 5,443,552 A | * | 8/1995 | Tomita ....................... | 73/861.17 |

(Continued)

*Primary Examiner* — Steven B McAllister
*Assistant Examiner* — Samantha A Miller

(57) ABSTRACT

An arrangement for controlling flow includes a flow control element, an actuator, a linkage assembly, and a sensor module. The linkage assembly is coupled between the flow control element and the actuator, and includes a rotatable linkage element coupled to impart force to the flow control element. The sensor module is affixed to the rotatable linkage element. The sensor module includes a MEMs-based strain gauge affixed to a substrate and operably coupled to measure torque on the linkage element, and a processing circuit disposed on the substrate. The processing circuit is operably coupled to receive torque measurement information representative of the measured torque. The processing circuit generates a fluid flow measurement value based on the torque measurement information and position information representative of a position of a flow control device of the flow control element. The flow control device is mechanically coupled to the rotatable linkage element.

19 Claims, 8 Drawing Sheets

Related U.S. Application Data continuation-in-part of application No. 11/520,496, filed on Sep. 13, 2006, now abandoned.

(60) Provisional application No. 60/716,876, filed on Sep. 13, 2005.

(51) Int. Cl.
  *F24F 110/00* (2018.01)
  *F24F 110/30* (2018.01)

(56) References Cited

U.S. PATENT DOCUMENTS

2004/0144849 A1* 7/2004 Ahmed .................. 236/1 E
2005/0138720 A1* 6/2005 Shim .................. E03D 9/052
                                                    4/213

* cited by examiner

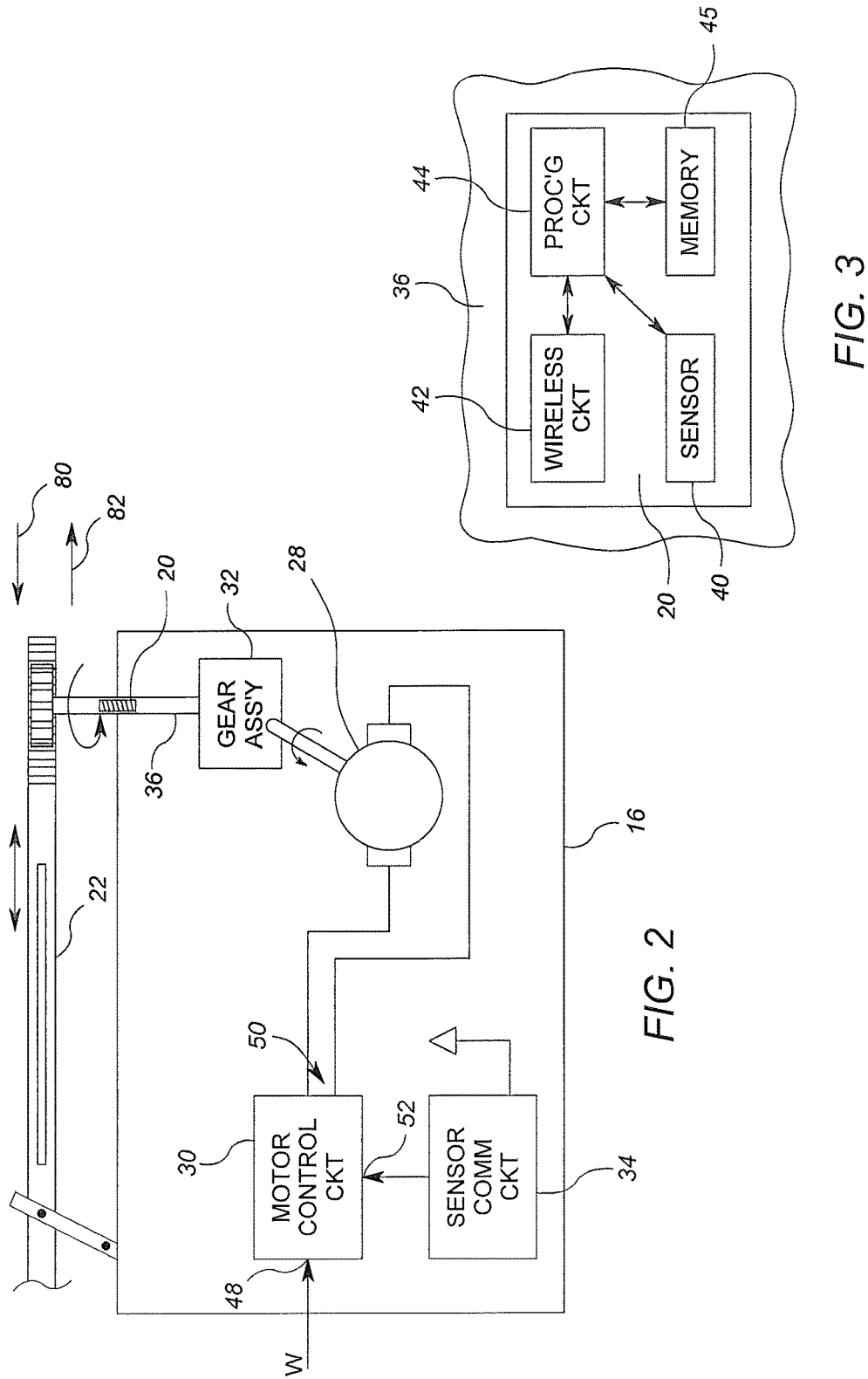

ARRANGEMENT AND METHOD TO SENSE FLOW USING MECHANICAL STRESS MICROSENSORS

This application is a continuation of U.S. patent application Ser. No. 12/220,848, filed Jul. 29, 2008, which is a division of U.S. patent application Ser. No. 11/528,710, filed Sep. 27, 2006, which is a continuation-in-part of U.S. patent application Ser. No. 11/520,496, filed Sep. 13, 2006, which claims the benefit of U.S. Provisional Patent Application Ser. No. 60/716,876, filed Sep. 13, 2005, all of which are incorporated herein by reference.

FIELD OF THE INVENTION

The present invention relates to devices that control or monitor fluid flow through a conduit or orifice.

BACKGROUND OF THE INVENTION

Many applications require the monitoring or control of fluid flow through a conduit or interface. For example, valves are used to control liquid or gas fluid flow through a pipe or conduit. To control the flow of the liquid, a valve is opened or closed. In many systems, liquid flow is automatically-controlled using an actuator connected to a valve. Responsive to control signals, the actuator causes the valve to be further opened or closed as necessary to achieve a desired liquid flow.

In another example, ventilation dampers are used to control the flow of air into ventilation ducts, rooms, or other spaces of a building or facility. For example, a ventilation damper may control the flow of cool air in to a room. In other examples, a ventilation damper may control the amount of exhaust air from a room, and/or the amount of recirculated and fresh air that is provided throughout a building. Ventilation dampers are movable such that they may be further opened or closed in order to increase or decrease, respectively, the flow of air through the damper assembly device. In building control systems, damper assembly devices are also known as variable-air-volume (VAV) diffusers or VAV units.

One example of a VAV unit and its operation is set forth in U.S. Pat. No. 6,581,847, which is incorporated herein by reference. The VAV unit of U.S. Pat. No. 6,581,847 teaches the control of room temperature using a VAV unit to vary the volume of supply air discharged into a room. The supply air is heated when the VAV unit is in a heating mode and is cooled when the system is in cooling mode. The supply air is usually provided at substantially a constant temperature in each mode. A VAV unit regulates the volume of heated or cooled supply air in order to achieve and maintain a desired room air temperature. To this end, a controlled actuator device operates to open or close a set of louvers or ventilation dampers to increase or decrease the flow of supplied air.

Typical controlled actuator devices include thermally-powered actuators, pneumatically-powered actuators, and electrically powered actuators. All three types of actuators are coupled to the ventilation dampers by a mechanical linkage, gear assembly levers and/or combinations of these and other mechanical couplings. The actuator performs controlled movements which are translated by the mechanical couplings to changes in the positions of the dampers.

Control units for liquid control valves and VAV units often maintain accurate information regarding the current position of the valve or damper. Accurate position information is useful for various reasons, including effective control and reliability. Inaccurate position information can even result in damage to a valve or VAV unit. In one example, if a damper is fully open, and the position information indicates that the damper is not fully open, then the control mechanism may attempt to further open the damper. The attempt to further open the damper that is already fully open is both inefficient and potentially harmful to the equipment.

In addition, VAV units and liquid control valves often have associated flow sensors to determine the actual flow of fluid (gas or liquid) through the damper or valve. Ultimately, it is the flow of the fluid that is to be controlled, and thus information regarding the flow of fluid through the valve or damper provides feedback which may be used to determine whether the valve or damper should be further opened, or further closed. However, air flow sensors and water flow sensors typically require several parts including differential pressure sensor elements, tubing and pickups. These elements contributed to the cost of both parts and labor, as several parts must be added and then wired.

Accordingly, there is a need for fluid flow control arrangements with improvements in fluid flow sensing technology that address at least some of the issues discussed above.

SUMMARY

The present invention addresses the above-described needs, as well as others, by providing a torque sensor module coupled directly to a rotating shaft of a mechanical portion of a flow control assembly such as a valve or damper. Preferably, the sensor module includes wireless communication capabilities. The torque sensor measures torque in the rotating shaft of the damper assembly to measure fluid flow. Fluid flow through a mechanical flow control device causes a rotational force on the device. The rotational force is translated to a rotating shaft directly or indirectly coupled to an actuator motor for the flow control device. The torque sensor on the shaft senses the fluid flow-induced rotational force and a flow measurement may be generated based thereon.

A first embodiment of the invention is a sensor module that includes a MEMs sensor device and a processing circuit. The MEMs sensor device is operable to determine a fluid flow induced mechanical force on a first flow control device connective element. The processing circuit is operably coupled to receive fluid flow induced mechanical force information based on the determined fluid flow induced mechanical force. The processing circuit is configured to generate a fluid flow measurement value based on the fluid flow induced mechanical force information and position information representative of a position of a flow control device coupled to the first flow control connective element.

The above described features and advantages, as well as others, will become more readily apparent to those of ordinary skill in the art by reference to the following detailed description and accompanying drawings.

BRIEF DESCRIPTION OF THE DRAWINGS

FIG. 2 shows a schematic block diagram of pertinent electrical components of the damper assembly of FIG. 1;

FIG. 3 shows a schematic block diagram of the sensor module of the damper assembly of FIGS. 1 and 2;

DETAILED DESCRIPTION

Figure 1:
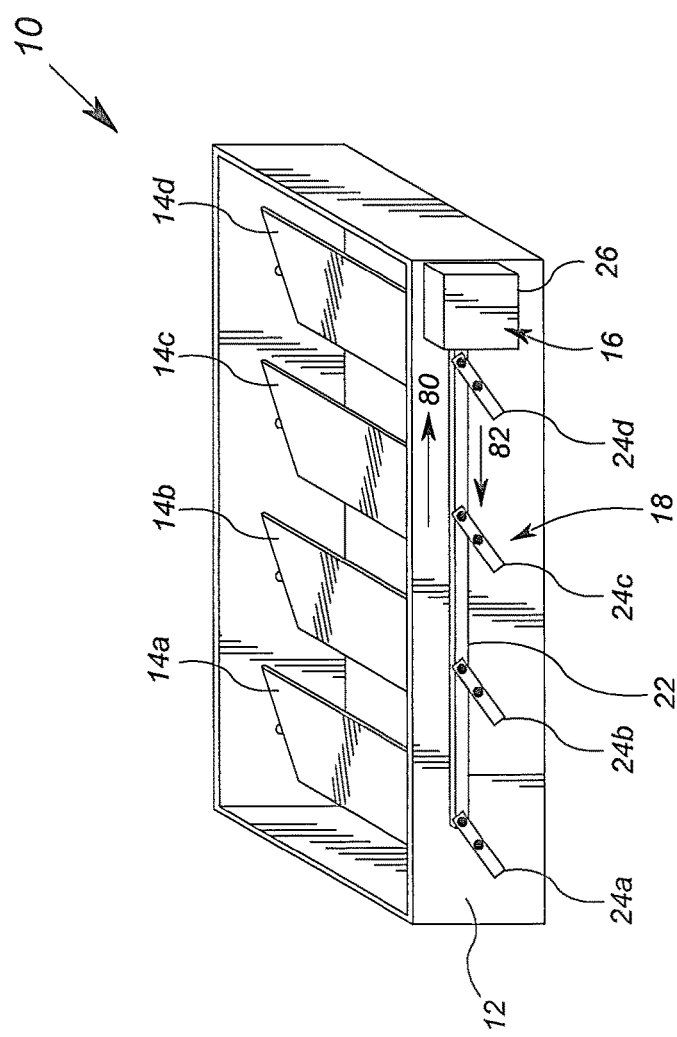
FIG. 1 shows a perspective view of an exemplary damper assembly according to the present invention.

FIG. 1 shows a perspective view of an exemplary damper assembly 10 according to the present invention. The electrical components of the damper assembly 10 are illustrated in FIG. 2. Reference is made simultaneously to FIGS. 1 and 2 in the ensuing description. The damper assembly 10 may be employed as a VAV unit. However, the damper assembly 10 may be used in other applications in which flow may be controlled.

The damper assembly includes a damper frame 12, a plurality of damper blades 14a, 14b, 14c, and 14d, an actuator module 16, a linkage assembly 18, and a sensor module 20. The damper frame 12 is a housing for a ventilation damper, which may suitably take the form of any housing for an HVAC ventilation damper or variable air volume ("VAV") unit. The plurality of damper blades 14a, 14b, 14c and 14d are movably attached to the damper frame 12 to at least partially regulate air flow proximate the damper frame 12. To this end, each of the damper blades 14a, 14b, 14c and 14d may rotate about its own longitudinal axis between a closed or nearly closed position and various degrees of open positions. It is noted that while four damper blades 14a, 14b, 14c and 14d are shown in the example of FIG. 1, other embodiments may employ as few as one damper blade and as many damper blades as is practicable. The blades 14a, 14b, 14c and 14d are shown in parallel format, wherein the blades open in the same direction. In alternative embodiments, the blades 14a, 14b, 14c and 14d (or a different number of blades) may be in an opposing configuration, wherein adjacent blades open in opposing directions. The blades 14a, 14b, 14c and 14d may have any shape normally associated with ventilation dampers. In this embodiment, the blades 14a, 14b, 14c and 14d have a generally rectangular, planar shape.

The actuator module 16 is an assembly that operates to cause movement of the damper blades 14a, 14b, 14c and 14d. More specifically, the actuator module 16 has a mechanical output operably connected to the linkage assembly 18 to cause controlled movement thereof. The actuator 16 is preferably affixed to a portion of the damper frame 12.

The linkage assembly 18 is configured to, when moved by the actuator module 16, rotate the damper blades 14a, 14b, 14c and 14d. Various types of linkage assemblies that translate actuator movement to rotational movement of damper blades are known and may suitably be used. In the exemplary embodiment described herein, the linkage assembly 18 includes a drive rod 22 and a plurality of linking members 24a, 24b, 24c and 24d. As shown in FIG. 2, the drive rod 22 is coupled via a rack and pinion gear to a rotating output shaft 36 of the actuator 16. Each of the linking members 24a, 24b, 24c and 24d are rotatably attached to the damper frame 12 and further fixedly coupled to a corresponding one of the damper blades 14a, 14b, 14c and 14d. Because the damper blades 14a, 14b, 14c and 14d are fixedly coupled to corresponding linking members 24a, 24b, 24c and 24d, rotational movement of the linking members 24a, 24b, 24c and 24d results in rotational movement of the damper blades 14a, 14b, 14c and 14d.

Referring again to the actuator module 16, the actuator module 16 in the exemplary embodiment described herein includes a housing 26 (FIG. 1) in which are contained a motor 28, a motor control circuit 30, a gear assembly 32, a sensor communication circuit 34, and an output shaft 36. (See FIG. 2) The housing 26 may suitably comprise an enclosure, or a container that is partially enclosed, which may take a variety of shapes.

Referring to FIG. 2, the motor control circuit 30 is a circuit that is operable to control the operation of the motor 28. The gear assembly 32 is coupled to the output of the motor 28 and further is coupled to the output shaft 36. The gear assembly 32 converts the output rotations of the motor 28 to the output rotations of the output shaft 36. Typically, the gear assembly 32 generates an output rotational speed that is lower than that of the motor 28 in order to provide slow, controlled movement of the output shaft 36. The output shaft 36 is operably connected to the linkage assembly 18, and more specifically, the drive rod 22. As the output shaft 36 rotates, the drive rod 22 translates in one of directions 80, 82, depending on the direction of rotation.

The actuator motor 28, gear assembly 32 and output shaft 36 may take the form of any suitable actuator motor and mechanical output design. Other embodiments may employ other prime movers, such as linear displacement devices, pneumatically-powered devices, thermally-powered devices, or the like, instead of a rotating motor. Still other embodiments may use return springs that bias the output shaft 36 such that the ventilation dampers are fully open or closed in the absence of electrical power to the motor 28. Moreover, the linkage assembly 18 may take any number of other forms. However, the linkage assembly 18 and/or the mechanical parts of the actuator 16 (which may be considered part of the linkage assembly 18), preferably includes at least one rotating shaft.

Regardless of the embodiment, however, the actuator module 16 is operable to cause rotation of at least one shaft to cause movement of the blades 14a, 14b, 14c, and 14d to approximately a predetermined position based on an input voltage received at the motor control circuit 30. Similarly, as a result of air flow through the spaces around the blades 14a, 14b, 14c and 14d, air pressure tends to cause the blades 14a, 14b, 14c and 14d to attempt to rotate. As the rotational force is translated toward the actuator 16, the actuator 16 resists the rotation. This force attempting rotation of the blades and stopped by the actuator 16 causes a torque pressure in any rotating shaft in the linkage assembly 18, including the shaft 36. The sensor assembly 20 is operable to detect that torque, and preferably identify the flow associated with the detected torque value. Air flow in a VAV damper assembly has a direct relationship to the torque seen by the damper shaft.

The sensor communication circuit 34 is operable to communicate wireless communication signals at least over the short range. For example, the sensor communication circuit 34 is operable to communicate using the Bluetooth communication standard. As used herein, wireless communication signals are considered to include the broader definition of electrical signals radiated through the air (i.e. without the benefit of an artificial communication medium such as a transmission line), regardless of frequency or modulation type.

The sensor communication circuit 34 is operably connected to provide air flow information to the motor control circuit 30, or to another control device in the building control system to which the VAV assembly 10 belongs. In particular, as will be discussed further below, the sensor communication circuit 34 is operable to provide air flow information regarding the VAV assembly 10 to the control device that regulates air flow. In one example, the motor control circuit 30 uses the air flow measurements as a feedback measurement and then controls the motor 28 to change the damper blade position to increase or decrease the flow as needed to achieve a desired flow.

As discussed above, the sensor module 20 is a device that detects and communicates air flow information regarding the VAV assembly 10. To this end, the sensor module 20 is in a fixed relationship with the rotatable shaft 36 to sense twisting or torque pressure on the shaft 36. As discussed above, the sensor module 20 may be affixed to other rotating shafts in this or other VAV linkage assembly designs.

FIG. 3 shows a schematic block diagram of an exemplary embodiment of the sensor module 20. In order to detect or obtain torque information regarding the shaft 36, the sensor module 20 includes a sensor device 40 that operates as a strain gauge operable to determine torque or strain along the shaft 36. (See FIG. 2) The sensor module 20 further includes a wireless communication circuit 42 operable to communicate the torque information to a wireless communication circuit disposed off of the output shaft 36. In the embodiment described herein, the wireless communication circuit 42 is operable to communicate position information at least to the sensor communication circuit 34 of the actuator module 16.

In the embodiment described herein, the sensor device 40 is preferably a microelectromechanical system sensor or MEMS sensor. MEMS sensors have the advantage of requiring relatively little space and electrical power, and have relatively little mass. A MEMS strain gauge sensor can readily fit onto a small enough footprint to allow the sensor module 20 to fit onto the output shaft 36. MEMS sensors capable of measuring torque of a shaft, and various methods of attaching sensors to the shaft, are known in the art.

Figure 5:
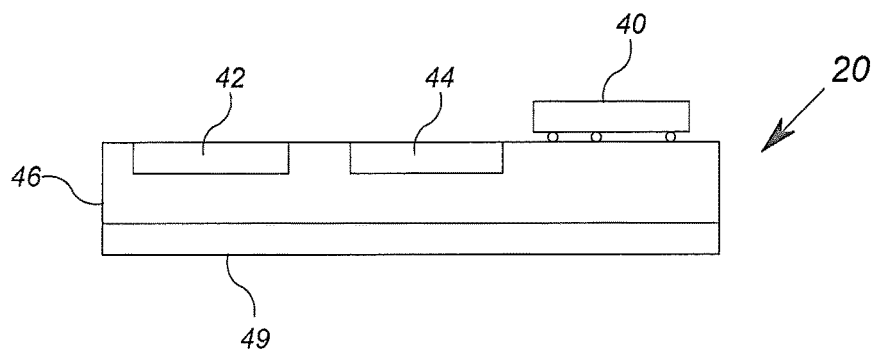
FIG. 5 shows a representative side view of an exemplary embodiment of a sensor module integrated onto a single semiconductor substrate.

Referring again generally to FIGS. 1 and 2, it is preferable if the communication circuit 42 and the processing circuit 44 are incorporated onto the same substrate as the sensor device 40. To this end, on-chip Bluetooth communication circuits are known. In addition, methods of attaching MEMS devices to semiconductor substrates is known, such as is taught in connection with FIG. 8 of U.S. patent application Ser. No. 10/951,450 filed Sep. 27, 2004 and which is incorporated herein by reference. FIG. 5 shows a side view of an exemplary sensor module 20 wherein the various components are incorporated into one chip.

The processing circuit 44 is operable to generate air flow information from the torque information. For example, the processing circuit 44 may use a look-up table to associate torque measurements with actual air flow. The relationship between air flow and shaft torque may be determined in a calibration operation. An exemplary calibration information is discussed below in connection with FIG. 8.

It will be appreciated that some or all of the processing of the torque information may be carried out elsewhere, such as in the motor control circuit 30, in order to conserve power. However, it is useful to at least include filtering in the processing circuit 44 in order to reduce the amount of data transmitted and thereby conserve power.

Referring to FIG. 5, a preferred embodiment of the sensor module 20 is a semiconductor substrate 46 having the processing circuit 44 and the communication circuit 42 formed thereon, and a MEMS sensor device 40 attached thereto, such as by flip-chip bonding. In addition, it would be advantageous to attach a power source such as a battery to the substrate 46. The battery may suitably be a lithium ion coin cell type structure 49 affixed to the side of the semiconductor substrate 46 opposite the processing circuit 44 and communication circuit 42. It will be appreciated that if a suitable communication circuit cannot be formed in the semiconductor substrate 46, it too may be separately formed and then attached via flip-chip or similar type of bonding.

Referring again to FIGS. 1 and 2, the damper assembly 10 is intended to provide a desired air flow by adjusting the positioning of the damper blades 14*a*, 14*b*, 14*c* and 14*d*. In the exemplary embodiment described herein, the desired air flow is provided as an input voltage or signal w by the motor control circuit 30 of the actuator module 16. The input signal w is a set point provided by an HVAC controller or the like, not shown, which determines the amount of air flow, which in turn determines the degree to which the damper blades 14*a*, 14*b*, 14*c* and 14*d* should be opened. The damper blades 14*a*, 14*b*, 14*c* and 14*d* are opened or closed in order to increase or decrease, respectively, the flow of heated or chilled air into an area of a building or ventilation shaft.

Ideally, the actuator module 16 and the linkage assembly 18 cooperate to position the damper blades 14*a*, 14*b*, 14*c* and 14*d* in the position that corresponds to the input signal w. However, due to errors and/or tolerances in the elements of the linkage assembly 18 and motor amplifiers and the like, accurate positioning is not practicable without at least some feedback regarding the position of the damper blades 14*a*, 14*b*, 14*c* and 14*d*. In accordance with the present invention, the position feedback is provided by any known method, such as that described in U.S. patent application Ser. No. 11/192,587, filed Jul. 29, 2005, which is incorporated herein by reference. With accurate feedback, damage from trying to open or close the damper blades 14*a*-*d* out of allowed ranges may be avoided.

Figure 4:
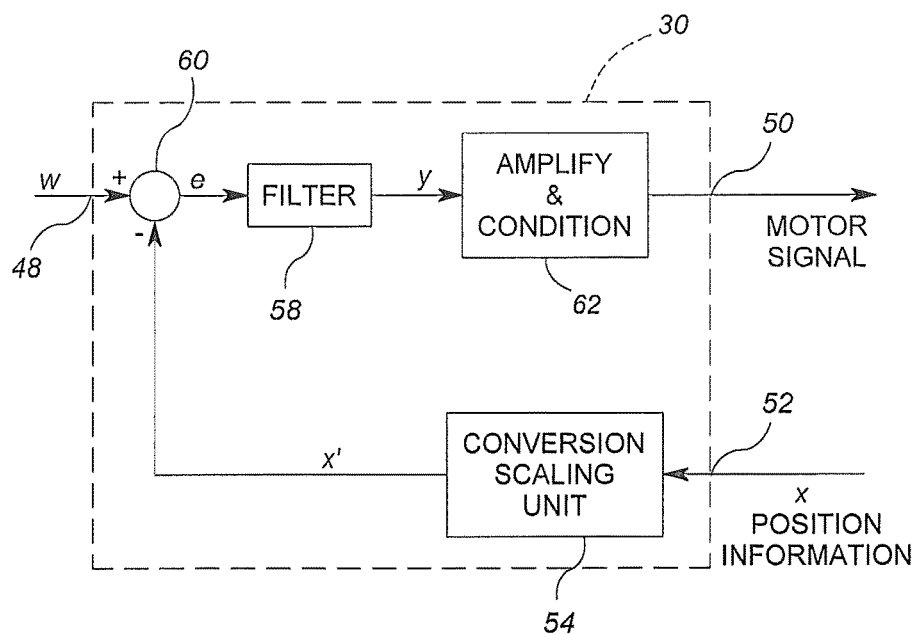
FIG. 4 shows a functional block diagram of a motor control circuit of the damper assembly of FIGS. 1 and 2.

In general, however, the motor control circuit 30 uses the actual air flow measurements provided by the sensor 20, and the desired air flow w, to adjust the position of the damper blades 14*a*, 14*b*, 14*c* and 14*d*. The feedback positioning control operation discussed above is carried out by the motor control circuit 30 in the embodiment described herein. A functional block diagram of the motor control circuit 30 is shown in FIG. 4. Referring to FIG. 4, the motor control circuit 30 includes a set point input 48, a motor control signal output 50, an air flow information input 52, a conversion/scaling unit 54, a filter 58, a summation device 60, and an amplifying and conditioning circuit 62.

As illustrated by FIG. 2, the set point input 48 is coupled to receive the input signal (representative of desired air flow rate) w, and the motor signal output 50 is operably coupled to the motor 28. In addition, the air flow information input 52 is connected to the communication circuit 34. Referring again to FIG. 4, the set point input 48 is operably coupled to a positive summation input of the summation device 60. A negative summation input of the summation device 60 is operably connected to receive a current flow signal x' from the flow information input 52 via the conversion/scaling unit 54.

The conversion/scaling unit 54 provides any conversion necessary between the units of the feedback flow information x from the input 52 and units of the desired air flow information employed by the input signal w. The conversion/scaling unit 54 may suitably include logic for unit conversion and conversion circuitry between analog and digital signals. The exact construction of the conversion/scaling unit 54 will depend on the formats of the flow information at the two inputs 48 and 52. Those of ordinary skill in the art may readily devise a suitable conversion circuit once the format of the air flow information at the two inputs 48 and 52 are known. In some embodiments, the input signal w will be converted to units of the air flow input signal x in the motor control circuit 30 prior to being forwarded to the summation device 60. In such a case, the conversion/scaling unit 54 would be coupled between the input 48 and the summation device 60.

In any event, the output of the summation device 60 is an error signal e that represents the difference between the desired air flow w and the current air flow x'. The summation device 60 is operably connected to provide the error signal to the filter 58, which is in turn coupled to the amplifying and conditioning circuit 62. The filter 58 is a control filtering device that provides a controlled loop delay and/or dampening function using proportional, proportion integrational derivative ("PID"), or other known control signal conditioning techniques. The filter 58 provides a desired transition profile (speed and dampening) between the current position of the damper blades, and the position of the damper blades 14a, 14b, 14c and 14d necessary to achieve the desired air flow. Fine position control may be carried out downstream of the filter 58, using the position feedback system taught by U.S. patent application Ser. No. 11/192,587, discussed above, or any other position feedback device. While such a feedback control is not shown in detail here, it may be provided as part of the filter 58. In either event, the outputy of the filter 58 is based on the error signal e and the control function.

The outputy of the filter 58 is connected to the amplifying and conditioning circuit 62. The amplifying and conditioning circuit 62 has the analog circuitry that converts a communicated control signal y (from the filter 58) into a motor control signal. The communicated control signal may suitably be a digital value, or an analog voltage signal, depending on the design of the control filter 58 and the format of the input signal w. In either case, the control output signal y typically is not specifically designed to control the motor 28 directly, but rather requires amplification, conditioning, and often conversion into another form. Suitable amplification and conditioning circuits are known and will vary depending on the design of the motor 28, the gear assembly 32 and linkage assembly 18. The output of the amplifying and conditioning circuit 62 is operably coupled to the motor signal output 50.

Operation of the damper assembly 10 is described in reference to FIGS. 1, 2, 3 and 4 simultaneously. Initially, a set point signal w is provided to the actuator module 16, and in particular, to the set point input 48 of the motor control circuit 30. The set point signal w in this embodiment is representative of a desired air flow through the assembly 10. By way of example, the desired air flow through the assembly may be derived by another control device, not shown. That control device may determine the desired air flow through the assembly 10 into the adjacent space based on: the temperature of the supply air; the desired temperature of the space; and any requirements for fresh air circulation in the space.

The motor control circuit 30 receives the input signal w and generates appropriate motor control signals to place the damper blades 14a, 14b, 14c and 14d.

To this end, referring to FIG. 4, the motor control circuit 30 receives the input signal w at the summation device 60. The negative input of the summation device 60 receives the value x', which is representative of the current air flow through the damper assembly 10. The current damper flow value x' is obtained from flow information generated by the sensor module 20. Obtaining that damper flow value x' is described in particular reference to FIG. 3.

Referring to FIG. 3, the sensor 40 of the sensor module 20 generates a signal representative of the torque on the shaft 36. The processing circuit 44 receives the torque signal and generates a refined value that constitutes the air flow information x. To generate the air flow value x, the processing circuit 44 may suitably employ analog to digital conversion, low pass filtering, and a look-up table or linear relationship on the torque signal.

More specifically, it has been determined experimentally that the measured torque value of the shaft 36 varies as a function of air flow and damper position. The phrase "damper position" describes the amount that the damper is opened or closed. In this embodiment, the damper position may be a number of values from 0° (fully closed) to 90° (fully open). In general, however, dampers tend not to be fully closed when used for room ventilation.

Figure 6:
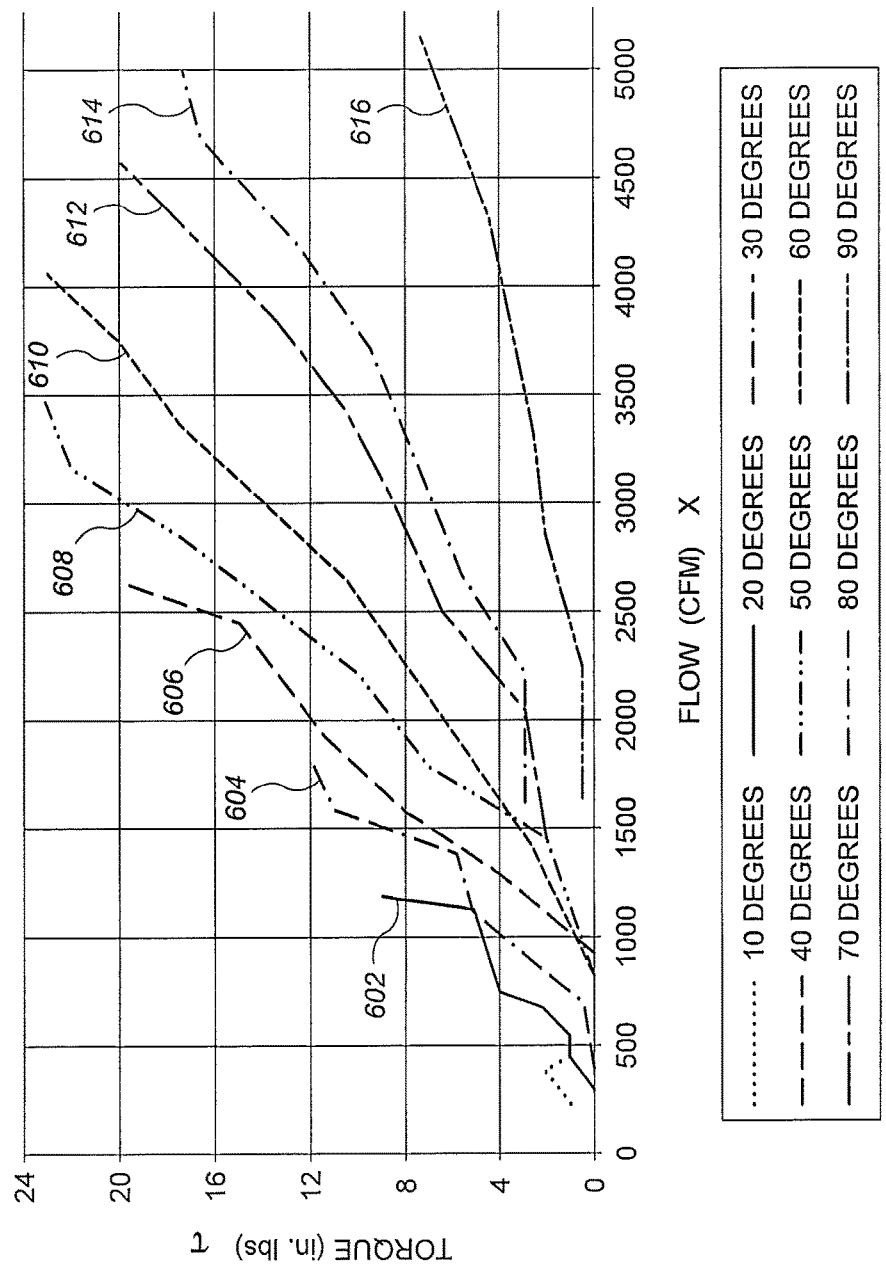
FIG. 6 shows a graph of torque v. flow for a plurality of damper positions for an exemplary sensor device.

Thus, the processing circuit 44 of FIG. 3 generates flow information in the form of a flow value x based on both torque measurements and the position of the damper. FIG. 6 shows an exemplary set of curves of torque versus air flow for a plurality of damper positions.

Because the processing circuit 44 uses both the torque of the shaft 36 and the damper position to determine flow information, information regarding the damper position must be provided to the processing circuit 44. To this end, the processing circuit 44 may obtain damper position information from the motor control circuit 30 via the wireless link between the sensor communication circuit 34 and the wireless circuit 42. However, in other embodiments, the sensor module 20 merely provides the torque measurement information to the motor control circuit 30, which in turn generates the flow value x using the received torque information and the otherwise available damper position information.

In this embodiment, it is assumed that the processing circuit 44 of the sensor module 20 obtains the damper position information and generates the flow information x as a function of the measured torque and the damper position. In such a case, the processing circuit 44 provides the flow information x to the wireless communication circuit 42.

The wireless communication circuit 42 of the sensor module 20 performs modulation, conditioning and amplification to generate a wireless air flow signal which is transmitted to the sensor communication circuit 34 of the actuator module 16. The sensor communication circuit 34 then provides the flow information x to the flow information input 52 of the motor control circuit 30.

Referring to FIG. 4, the conversion/scaling unit 54 performs, if necessary, conversion of the position information x to generate the flow information x' in appropriate units.

Thus, the summation device 60 receives the value w representative of the new desired flow value at its positive summation input and the value x' representative of the current flow value x' at its negative summation input. The output of the summation device 60, the error signal e, is a signed value representative of the amount that the damper flow has to be adjusted to achieve the desired air flow w.

The filter 58 receives the error signal e and generates a process signal y based thereon. The process signal y constitutes the output of the control algorithm. The filter 58 provides the process signal y to the amplifying and conditioning circuit 62. As discussed above, the filter 58 may incorporate a position feedback system that generates position information, based on the desired flow information. Such devices are well known. However, the flow information may be used for direct control without position feedback in some cases, provided there are safeguards from over positioning the damper blades. In any event, the amplifying and conditioning circuit 62 generates the motor control signals to change the damper position from the present position by an amount (and direction) indicated in the process signal y. These motor control signals are provided to the motor control output 50.

Referring again generally to FIGS. 1 and 2, the motor 28 receives the motor control signals from the motor control output 50 and generates an amount of rotation, as well as direction of rotation, corresponding to the motor control signals. The gear assembly 32 converts the motor rotation to a suitable movement of the output shaft 36, which in turn, drives the drive rod 22. The movement of the drive rod 22 rotates the linking members 24a, 24b, 24c and 24d by an amount and direction corresponding to the output signal y. The linking members 24a, 24b, 24c and 24d rotate the damper blades 14a, 14b, 14c and 14d accordingly.

When the damper blades 14a-d are at rest, air flow will impinge upon the blades and attempt to cause them to rotate.

As the blades 14a, 14b, 14c and 14d experience the rotational force due to the impingement of the air flow, the force is translated by the linking members 24a, 24b, 24c and 24d to the drive rod 22, which in turn translates the air flow induced mechanical/rotational force on the output shaft 36. Because the output shaft 36 cannot rotate due to holding forces of the actuator 16, the output shaft 36 experiences torque or twisting force that may be translated from end to end. The sensor 40 of the sensor module 20 detects the torque force and generates a new signal. The processing circuit 44 (in this embodiment) converts the new torque information to a flow value x, and causes the wireless circuit 42 to transmit the new flow information x (or torque information in other embodiments) to the communication circuit 34 of the actuator module 16. The communication circuit 34 provides the new flow information x to the air flow information input 52 of the motor control circuit 30.

The above described process repeats iteratively, so that the actual measured air flow matches, or at least falls within a predetermined error window of, the desired air flow w.

It will be appreciated that the flow information x need not be communicated to the actuator module 16 directly. Another wireless communication device may receive the transmitted position information from the sensor module 20, and then forward the sensor information to the actuator module 16 or any other control device by other means. In fact, a wireless circuit may not be necessary. In addition, other elements of the actuator module 16 may suitably be located in separate housings as opposed to within a single housing as described above. However, the embodiment of FIG. 2 provides the added advantage of providing a compact and easy to install configuration.

Figure 7:
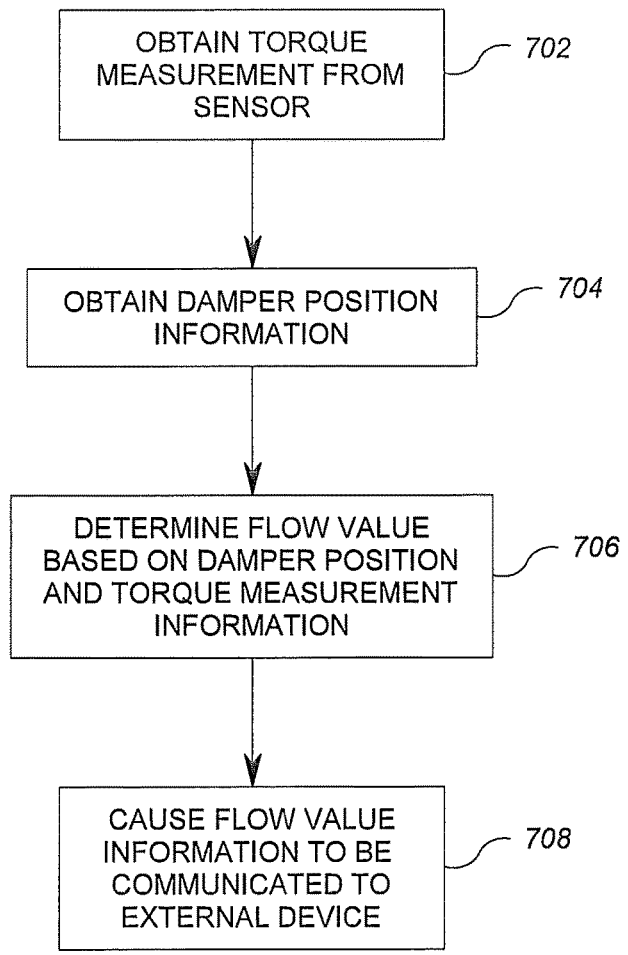
FIG. 7 shows a flow diagram of an exemplary set of operations performed by a processing circuit to generate flow information based on damper position and torque measurements.
Figure 8:
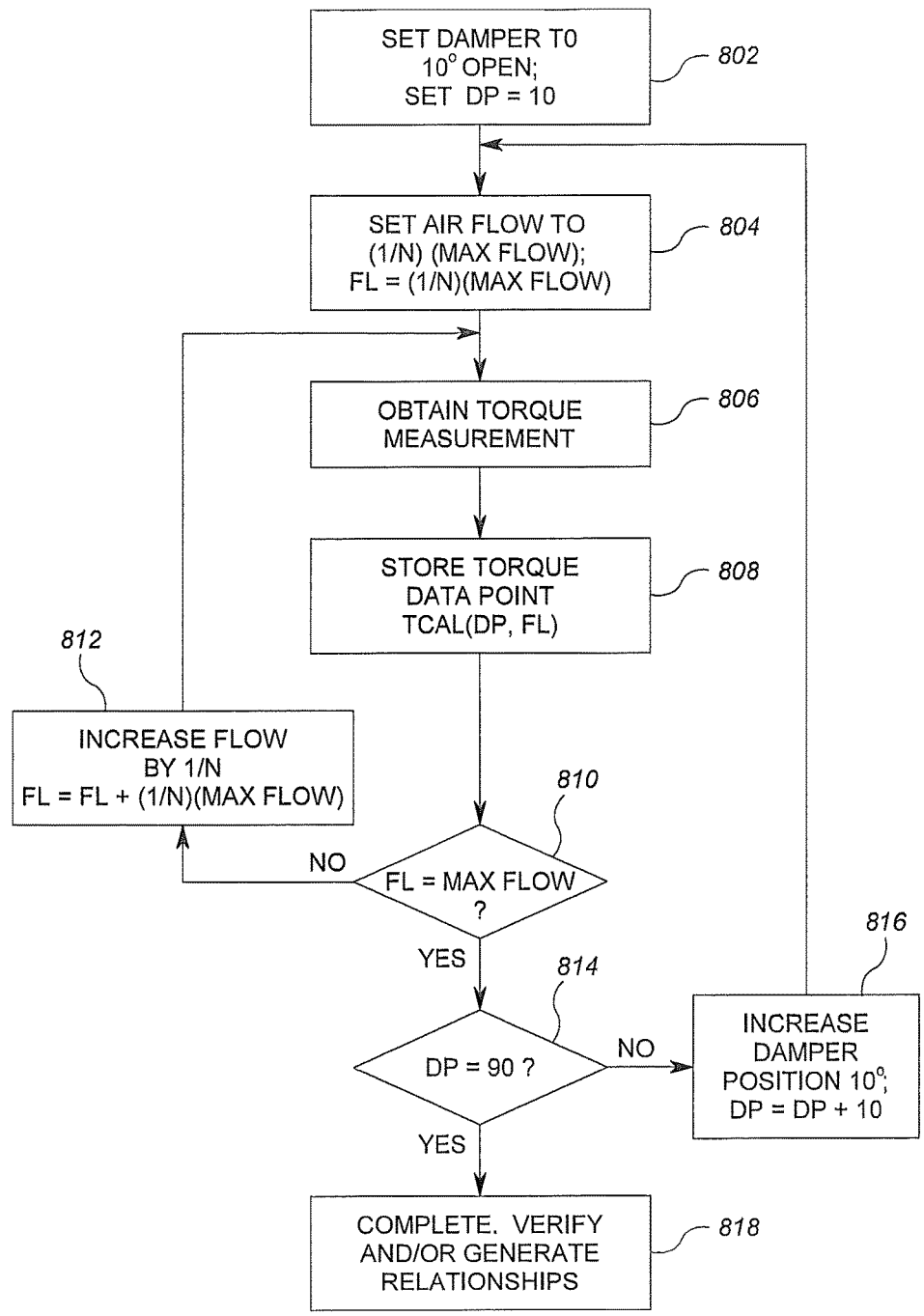
FIG. 8 shows an exemplary set of operations that may be performed to obtain a relationship between air flow through a damper and torque measurements.

FIGS. 6, 7 and 8 illustrate in further detail how, in the exemplary embodiment described herein, the processing circuit 44 may generate flow information based on damper position information $\varphi$ and measured torque value $\tau$. FIG. 7 shows a series of steps that may be carried out to this end. In the embodiment described herein, the steps of FIG. 7 are carried out by suitable programming of the processing circuit 44. However, in other embodiments, processing circuits of other devices, such as the motor control circuit 30 of FIG. 2, for example, may carry out the steps of FIG. 7.

In step 702, the processing circuit obtains a torque measurement from the sensor 40. To this end, the processing circuit may include A/D conversion circuitry and/or other conditioning circuitry known in the art that can convert a MEMS strain sensor output to an input for a processing device.

In step 704, the processing circuit obtains the damper position. In the embodiment described herein, the processing circuit 44 obtains the damper position from the motor control circuit 30, which will typically retain such information to allow for closed loop control of damper movement and/or for other reasons, as is known in the art. The motor control circuit 30 may provide the information to the processing circuit 44 via the wireless communication circuits 34 and 42. Such damper position information may be included in a request for flow information issued by the motor control circuit 30.

In step 706, the processing circuit determines a flow value x based on the damper position information $\varphi$ and the torque measurement $\tau$ obtained from the sensor 40. In other words, the processing circuit solves the equation:

$$x=F\{\varphi,\tau\}$$

where $F\{\varphi, \tau\}$ describes a function or series of functions that generate a flow measurement value x as a function of damper position and damper shaft torque. In one embodiment, the function $F\{\varphi, \tau\}$ includes a separate $x=F^{\varphi}\{\tau\}$ for each damper position value $\varphi$. By way of example, FIG. 6 shows a series of curves 602, 604, 606, 608, 610, 612, 614 and 616, each representing a torque versus flow curve, $x=F^{\varphi}\{\tau\}$, for one particular damper position $\varphi$. By way of example, the curve 602 shows the torque versus flow curve for a damper position of 20° open ($\varphi=20$). When a damper is said to be at the 20° position, it means that each damper blade is approximately 20° from a position at which the damper blades as a group would completely close. Thus, when a damper is said to be at 90° position, it means that the damper is 90° from being fully closed, which means that the damper is fully open.

The series of curves 602-616 of FIG. 6 may be represented in a memory (i.e. the memory 45 of FIG. 3) as a series of piecewise linear functions $x=F^{\varphi}\{T\}$ indexed by damper position $\varphi$. In particular, for each damper position, the curve may suitably be a piecewise linear function derived from a series of calibration points of torque versus flow. FIG. 8, discussed further below, describes a calibration function in which a particular sensor module 20 may be calibrated to generate the relationships between flow, damper position and torque.

Referring again to step 706, the processing circuit thus obtains the flow value x based on torque and damper position and proceeds to step 708. In step 708, the processing circuit 44 causes the information to be communicated wirelessly to the motor control circuit 30, as described more generally above. In other embodiments, the processing circuit 44 can cause the information to be communicated wirelessly to another device, such as a data collector, or a network interface device.

FIG. 8 describes a calibration operation in which information regarding the torque/flow correspondence is obtained. The result of the operations of FIG. 8 may suitably be a table of torque values corresponding to flow values for each of a set of damper positions. This table may be used to generate piecewise linear functions of sensor torque versus flow for each damper position, such as those illustrated in FIG. 6. The calibration operation is performed by placing the damper assembly 10 with the sensor module 20 in a test chamber in which air flow may be controllably passed through the damper assembly 10. In addition, one or more high accuracy flow sensors should also be attached at a position in the opening of the damper to measure the actual test flow. Such calibration set-ups for providing controlled flow through a damper and measuring the flow are known in the art.

The calibration operation may be automated by a calibration control processing circuit or device, not shown. It is also possible to include the calibration program of FIG. 8 in the processing circuit 44 of the sensor module 20, or the motor control circuit 30 of the actuator module 16.

In any event, in step 802, the processing circuit causes the damper position to be moved to the 10° symbol and sets an internal variable DP=10.

Thereafter, in step 804, the processing circuit causes the calibration air flow to be set to a first value, which may suitably be $1/N^{th}$ of a maximum test air flow value, where N is the number of sample points to be taken for each damper position. For example, if the maximum test air flow value is 2500 cubic feet per minute, and there are to be five sample points taken, then the first value would be 2500/5 or 500 cubic feet per minute. The processing circuit also sets an internal value of FL=1/N (Max Flow). The processing circuit then proceeds to step 806.

In step 806, the processing circuit obtains a torque measurement from the sensor 40 of the sensor module 20. This value represents the torque that is measured when the damper position is equal to DP (in degrees) and the flow is equal to FL.

In step 808, the processing circuit stored the torque measurement in a table or as an array value TCAL (DP, FL). This point may be graphed to a point on a graph similar to that of FIG. 6.

In step 810, the processing circuit determines whether FL=Max Flow. If so, then all N data points of torque versus flow have been obtained for the current damper position, and the processing circuit proceeds to step 814. If not, however, then additional data points should be taken for the current damper position, and the processing circuit proceeds to step 812.

In step 812, the processing circuit causes the calibration air flow value to be increased by $1/N^{th}$ of the maximum flow value, and changes the internal variable FL to FL=FL+(1/N) Max Flow. The processing circuit then returns to step 806 and proceeds accordingly.

In step 814, the processing circuit determines whether the current damper position is 90°, or in other words, if DP=90. If so, then the calibration operation is complete and the processing circuit proceeds to step 818, discussed further below.

If not, however, then the processing circuit proceeds to step 816 to change the damper position for the purpose of obtaining a new set of torque versus flow calibration table measurements. Accordingly, in step 816, the processing circuit causes the damper position to be increased by 10° and increments the internal value DP to DP=DP+10. The processing circuit then returns to step 804 in order to reset the air flow to FL=(1/N)(Flow Max) and to proceed accordingly.

In step 818, the gathering of calibration points is complete. These calibration points associate a torque measurement with an actual measured flow for each of a plurality of damper positions. It is noted that if verification is desired, then the entire process of FIG. 8 may be repeated for the same sensor.

Because sufficient data points have been gathered, a function $x=F^{\varphi}(\tau)$ may be generated for each damper position $\varphi$. For example, a piecewise linear function $F^{\varphi}(\tau)$ for each damper position $\varphi$ may be created by interpolating between adjacent data points on the table created by the operations of FIG. 8. Alternatively, each function $F^{\varphi}(\tau)$ may be generated using a best fit curve of the data points on the table created by the operations of FIG. 8. Still other methods of using the calibration points to create a function or series of functions $F(\varphi, \tau)$ for use in generating a flow value x based on damper position $\varphi$ and a measured torque value $\tau$ may be used.

In another embodiment of the invention, control of another fluid flow control device, a valve, may be carried out in a similar manner.

Figure 9:
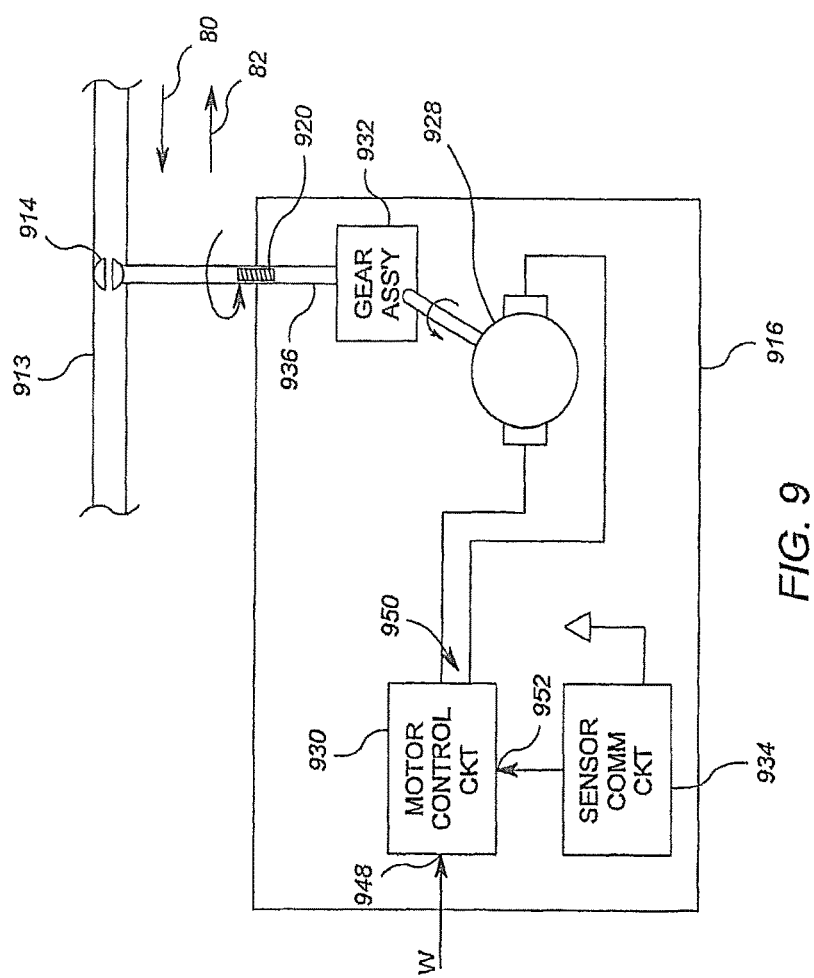
FIG. 9 shows a schematic block diagram of pertinent components of a valve assembly according to an embodiment of the invention.

In particular, FIG. 9 shows an adaptation of the elements of FIG. 2 for use in controlling a water or liquid valve 914. The valve assembly includes a liquid valve 914 (e.g. a ball valve) movably secured within a pipe 913, an actuator module 916, a shaft 936, and a sensor module 920. The liquid valve 914 is movably attached at least indirectly to the pipe 913 to at least partially regulate liquid flow within the pipe 913. To this end, the ball valve 914 may rotate about its own longitudinal axis between a closed or nearly closed position and various degrees of open positions.

The actuator module 916 is an assembly that operates to cause movement of the valve 914. More specifically, the actuator module 916 has a mechanical output operably connected to the shaft 936 to cause controlled movement thereof.

The shaft 936 is configured to, when moved by the actuator module 916, rotate the valve 914. Various types of linkage assemblies that translate actuator movement to rotational movement of valves are known and may suitably be used.

Referring again to the actuator module 916, the actuator module 916 in the exemplary embodiment described herein includes a housing in which are contained a motor 928, a motor control circuit 930, a gear assembly 932, a sensor communication circuit 934, and an output shaft 936.

The motor control circuit 930 is a circuit that is operable to control the operation of the motor 928, similar to the motor control circuit 30 of FIG. 2. The gear assembly 932 is coupled to the output of the motor 928 and further is coupled to the output shaft 936. The gear assembly 932 converts the output rotations of the motor 928 to the output rotations of the output shaft 936. In some embodiments, the motor 928 may be directly coupled to the output shaft 936. The output shaft 936 is operably connected to the ball valve 914. As the output shaft 936 rotates, the ball valve 914 rotates, which results in opening or closing of the valve, as is well known in the art.

The actuator motor 928, gear assembly 932 and output shaft 936 may take the form of any suitable actuator motor and mechanical output design.

The sensor communication circuit 934 is operable to communicate wireless communication signals at least over the short range. For example, the sensor communication circuit 934 is operable to communicate using the Bluetooth communication standard. In this embodiment, the sensor communication circuit 934 is at least operable to communicate wirelessly with the sensor module 920. However, it will be appreciated that sensor module 920 may in some cases be wire-connected to the sensor communication circuit 934 or even directly to the motor control circuit 930.

The sensor communication circuit 934 is operably connected to provide liquid flow information to the motor control circuit 930, or to another control device in the building system to which the valve assembly is connected. In particular, similar to the communication circuit 34 of FIG. 2, the sensor communication circuit 934 is operable to provide liquid flow information regarding the valve 914 to the control device (i.e. the motor control circuit 930) that regulates liquid flow. In this example, the motor control circuit 930 uses the liquid flow measurements as a feedback measurement and then controls the motor 928 to change the valve position to increase or decrease the flow as needed to achieve a desired flow.

As discussed above, the sensor module 920 is a device that detects and communicates water or liquid flow information regarding the valve 914. To this end, the sensor module 920 is in a fixed relationship with the rotatable shaft 936 to sense twisting or torque pressure on the shaft 936. In this respect, the sensor module 920 is substantially similar to the sensor module 20 of FIG. 2 in operation and structure. Essentially, the sensor module 920 uses a torque sensor to sense torque that arises from the liquid flow impinging on the valve 914. Torque arises from the impingement as the liquid flow force on the valve 914 is translated back to the rotating shaft 936. The sensor module 920 correlates the torque on the shaft to a liquid flow value. As with the embodiment of FIGS. 1-8, the liquid flow value is advantageously derived not only from the torque measurement obtained by the sensor module 920, but also from the current position of the valve 914.

This liquid flow value, derived at least in part from the torque measurement obtained by the sensor module, is used as feedback in the control of the valve assembly. In general, the valve assembly of FIG. 9 is intended to provide a desired liquid flow by adjusting the positioning of the valve 914. In the exemplary embodiment described herein, the desired liquid flow is provided as an input voltage or signal w by the motor control circuit 930 of the actuator module 916. The input signal w is a set point provided by an HVAC controller or the like, not shown, which determines the amount of liquid flow, which in turn determines the degree to which the valve 914 should be opened. As the valve 914 opens, more liquid flows through the pipe 913.

Thus, in operation, the motor control circuit 930 uses the actual liquid flow measurements provided by the sensor 920, and the desired liquid flow w, to adjust the position of the valve 914. The feedback positioning control operation discussed above is carried out by the motor control circuit 930 in the embodiment described herein. The motor control circuit 930 may suitably have the general function and operation as the motor control circuit 930 of FIGS. 2 and 4.

In particular, like the motor control circuit 30 of FIG. 4, the motor control circuit 930 includes a set point input 948 coupled to receive the input signal (representative of desired liquid flow rate) w, a liquid flow information input 952, and a motor signal output 950 which is operably coupled to the motor 928. The liquid flow information input 952 is connected to receive liquid flow measurement information from the sensor communication circuit 934, which in turn receives the liquid flow measurement information from the sensor module 920. The motor control circuit 930 operates in a manner similar to that described above in connection with FIG. 4 to generate the motor signal output 950 based on the liquid flow information and the set point w.

As mentioned above, the liquid flow information is derived from a sensed torque on a mechanical linkage element of the valve assembly, which in this embodiment is the shaft 936. When the valve 914 is at rest, liquid flow will impinge upon the valve member and attempt to cause it to rotate.

As the valve 914 experiences the rotational force due to the impingement of the liquid flow, the force is translated to a rotational force on the shaft 936. Because the output shaft 936 cannot rotate due to holding forces of the actuator 916, the output shaft 936 experiences torque or twisting force that may be translated from end to end. The sensor of the sensor module 920 detects the torque force and generates a new signal. The processing circuit of the sensor module 920 converts the new torque information to a flow value x, and causes the wireless circuit of the sensor module 920 to transmit the new flow information x (or torque information in other embodiments) to the communication circuit 934 of the actuator module 916. The communication circuit 934 provides the new flow information x to the liquid flow information input 952 of the motor control circuit 930.

The above described process repeats iteratively, so that the actual measured liquid flow matches, or at least falls within a predetermined error window of, the desired liquid flow w.

Figure 10:
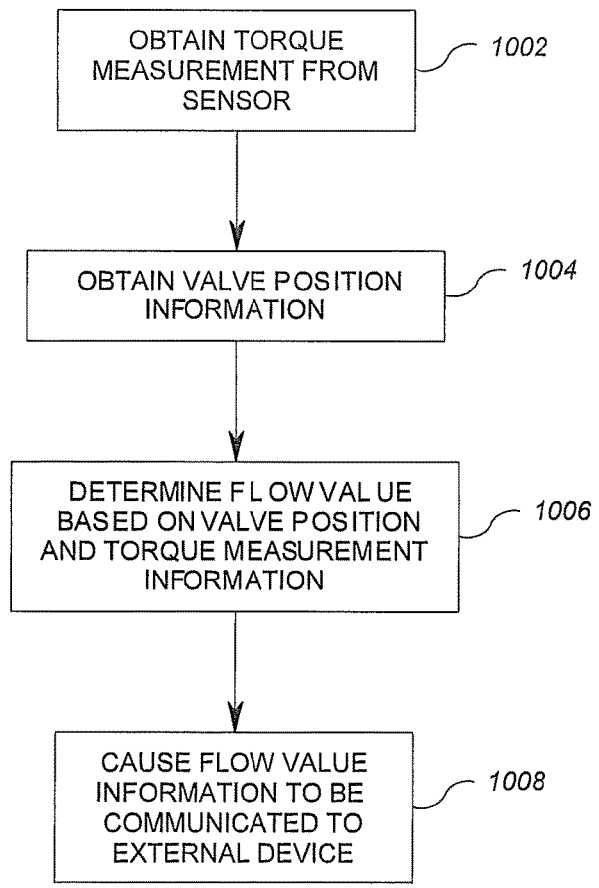
FIG. 10 shows a flow diagram of an exemplary set of operations performed by a processing circuit to generate flow information based on valve position and torque measurements.

FIG. 10 illustrates in further detail how, in the exemplary embodiment described herein, a processing circuit such as the processing circuit of the sensor module 920 (e.g. the processing circuit 44 of FIG. 3) may generate flow information based on a measured torque value. As mentioned with regard to the damper flow control discussed above in connection with FIGS. 1-8, the actual flow value is a function of both the measured torque on the sensor device 920 and the valve position at the time of the torque measurement.

FIG. 10 shows a series of steps that may be carried out to generate flow values based on measured torque τ and the contemporaneous valve position (degree of openness) φ. In the embodiment described herein, the steps of FIG. 10 are carried out by suitable programming of the processing circuit of the sensor module 920. However, in other embodiments, processing circuits of other devices, such as the motor control circuit 930 of FIG. 9, for example, may carry out the steps of FIG. 10.

In step 1002, the processing circuit obtains a torque measurement from the sensor device of the sensor module 920. To this end, the processing circuit may include A/D conversion circuitry and/or other conditioning circuitry known in the art that can convert a MEMS strain sensor output to an input for a processing device.

In step 1004, the processing circuit obtains the valve position φ. In the embodiment described herein, the processing circuit obtains the valve position from the motor control circuit, which will typically retain such information to allow for closed loop control of valve movement and/or for other reasons, as is known in the art.

In step 1006, the processing circuit determines a flow value x based on the valve position information φ and the torque measurement τ obtained from the sensor module 920. In other words, the processing circuit solves the equation:

$$x = F\{\varphi, \tau\}$$

where $F\{\varphi, \tau\}$ describes a function or series of functions that generate a flow measurement value x as a function of valve position and valve shaft torque. These functions may be derived in a similar manner as that described above in connection with the functions for determining air flow in a valve assembly. (See FIGS. 6, 7, 8).

In any event, the processing circuit obtains the flow value x based on torque and valve position and proceeds to step 1008. In step 1008, the processing circuit causes the information to be communicated wirelessly to the motor control circuit 930, as described more generally above. In other embodiments, the processing circuit can cause the information to be communicated wirelessly to another device, such as a data collector, or a network interface device.

It will be appreciated that when the valve 914 (or damper 14) is nearly completely closed or nearly completely open, the torque vs. flow function becomes somewhat less reliable. If flow values are need for these positions, an alternative sensing device may be necessary. However, such a sensing device may have reduced cost as it would not require the range and/or accuracy as a sole flow sensor. Such a sensor may suitably be a MEMs-based wireless flow sensor module to further reduce wiring costs. In some cases, accuracy of near fully-closed or near fully-open dampers or valves is not critical, and may in some cases be estimated using a temporary measurement at another position. Those of ordinary skill in the art may readily determine whether further accuracy is necessary at the nearly fully closed or nearly fully open positions.

It will further be appreciated that the above described embodiments are merely exemplary, and that those of ordinary skill in the art may devise their own modifications and implementations that incorporate the principles of the present invention and fall within the spirit and scope thereof.

We claim:

1. A damper assembly comprising: a damper frame; a plurality of damper blades, each having a rotary shaft, disposed on the damper frame, each of the damper blades rotatable through a plurality of damper positions; an actuator module; and a linkage assembly operably coupled between the actuator module and the plurality of damper blades, the linkage assembly including a linkage element coupled to impart rotational force to each of the plurality of damper blades; and a sensor module affixed to the linkage element, the sensor module including a MEMs-based strain gauge affixed to a substrate and operably coupled to measure torque on the linkage element, and a processing circuit disposed on the substrate, the processing circuit operably coupled to receive torque measurement information representative of the measured torque, the processing circuit operable to generate a fluid flow measurement value based on the torque measurement information and on position information representative of a current damper position.

2. The damper assembly of claim 1, wherein the actuator module is affixed to the damper frame.

3. The damper assembly of claim 2, wherein the sensor module is configured to communicate information representative of the fluid flow measurement value to the actuator module, and wherein the actuator module is further configured to produce an output force based at least in part on the communicated information.

4. The damper assembly of claim 3, wherein the sensor module includes a wireless communication circuit, and wherein the wireless communication circuit is configured to communicate the information representative of the fluid flow measurement value to the actuator module.

5. The damper assembly of claim 1, wherein the processing circuit is further configured to generate the fluid flow measurement value by selecting one of a plurality of relationships between the torque measurement information and fluid flow, the selection of one of the plurality of relationships based on the position information.

6. The damper assembly of claim 5, wherein the processing circuit further includes a low pass filter configured to provide low pass filtering to the torque measurement information.

7. A damper assembly comprising: a damper frame; a plurality of damper blades, each having a rotary shaft, disposed on the damper frame, each of the damper blades rotatable through a plurality of damper positions; an actuator module; and a linkage assembly operably coupled between the actuator module and the plurality of damper blades, the linkage assembly including a linkage element coupled to impart rotational force to each of the plurality of damper blades; and a sensor module affixed to the linkage element, the sensor module including a MEMs-based strain gauge affixed to a substrate and operably coupled to measure torque on the linkage element, and a processing circuit disposed on the substrate, the processing circuit operably coupled to receive torque measurement information representative of the measured torque, the processing circuit operable to generate a fluid flow measurement value based on the torque measurement information and on position information representative of a current damper position, wherein the linkage assembly further includes a drive rod, a plurality of linking members, and a rotatable output shaft, the rotatable output shaft operably coupled between the actuator module and the drive rod, the drive rod coupled to and extending between each of the plurality of linking members and the rotatable output shaft, each of the plurality of linking members operably coupled to translate movement force from the drive rod to a corresponding one of the plurality of damper blades, and wherein the sensor module is affixed to the rotatable output shaft.

8. The damper assembly of claim 7, wherein the processing circuit is further configured to generate the fluid flow measurement value by selecting one of a plurality of relationships between the torque measurement information and fluid flow, the selection of one of the plurality of relationships based on the position information.

9. The damper assembly of claim 8, wherein the processing circuit further includes a low pass filter configured to provide low pass filtering to the torque measurement information.

10. An arrangement for controlling flow, comprising: a flow control element a damper frame; a plurality of flow control elements, each flow control element including a damper blade having a rotable shaft disposed on the damper frame rotatable through a plurality of damper positions; an actuator; a linkage assembly coupled between the each of the plurality of flow control elements and the actuator, the linkage assembly including a rotatable linkage element coupled to impart force to the each of the plurality of flow control elements; and a sensor module affixed to the rotatable linkage element, the sensor module including a MEMs-based strain gauge affixed to a substrate and operably coupled to measure torque on the linkage element, and a processing circuit disposed on the substrate, the processing circuit operably coupled to receive torque measurement information representative of the measured torque, the processing circuit operable to generate a fluid flow measurement value based on the torque measurement information and position information representative of a position of the each of the plurality of flow control elements.

11. The arrangement of claim 10, wherein the processing circuit is further configured to generate the fluid flow measurement value by selecting one of a plurality of relationships between the torque measurement information and fluid flow, the selection of one of the plurality of relationships based on the position information.

12. The arrangement of claim 11, wherein the processing circuit further includes a low pass filter configured to provide low pass filtering to the torque measurement information.

13. The arrangement of claim 12, wherein the sensor module further comprises a memory storing the plurality of relationships.

14. The arrangement of claim 13, wherein the sensor module further comprises a first wireless communication circuit operable to communicate information including the fluid flow measurement value to a second wireless communication circuit.

15. The arrangement of claim 14, wherein the first wireless communication circuit includes an RF communication device.

16. The arrangement of claim 10, wherein the processing circuit is further configured to generate the fluid flow measurement value by selecting one of a plurality of piecewise linear functions.

17. The arrangement of claim 16, wherein the sensor module further comprises a memory storing the plurality of piecewise linear functions.

18. The arrangement of claim 17, wherein each of the plurality of piecewise linear functions provides a fluid flow value as a function of fluid flow induced force information.

19. The arrangement of claim 16, wherein each of the plurality of piecewise linear functions provides a fluid flow value as a function of fluid flow induced force information.

* * * * *